(12) United States Patent
Kim et al.

(10) Patent No.: US 11,978,851 B2
(45) Date of Patent: May 7, 2024

(54) COATED SEPARATOR FOR ENERGY STORAGE DEVICE

(71) Applicant: SK ON CO., LTD., Seoul (KR)

(72) Inventors: Jangwoo Kim, San Jose, CA (US); Young-Hye Na, San Jose, CA (US); Andy Theodora Tek, San Jose, CA (US)

(73) Assignee: SK ON CO., LTD., Seoul (KR)

( * ) Notice: Subject to any disclaimer, the term of this patent is extended or adjusted under 35 U.S.C. 154(b) by 675 days.

(21) Appl. No.: 16/293,111

(22) Filed: Mar. 5, 2019

(65) Prior Publication Data

US 2020/0287189 A1    Sep. 10, 2020

(51) Int. Cl.
| | |
|---|---|
| *H01M 10/052* | (2010.01) |
| *H01M 10/0565* | (2010.01) |
| *H01M 50/403* | (2021.01) |
| *H01M 50/414* | (2021.01) |
| *H01M 50/437* | (2021.01) |
| *H01M 50/44* | (2021.01) |
| *H01M 50/449* | (2021.01) |
| *H01M 50/469* | (2021.01) |

(52) U.S. Cl.
CPC ..... *H01M 10/0565* (2013.01); *H01M 10/052* (2013.01); *H01M 50/403* (2021.01); *H01M 50/414* (2021.01); *H01M 50/437* (2021.01); *H01M 50/44* (2021.01); *H01M 50/449* (2021.01); *H01M 50/469* (2021.01)

(58) Field of Classification Search
CPC ........... H01M 10/0565; H01M 10/052; H01M 50/437; H01M 50/469; H01M 50/414; H01M 50/403; H01M 50/44; H01M 50/449

See application file for complete search history.

(56) References Cited

U.S. PATENT DOCUMENTS

| | | | |
|---|---|---|---|
| 9,997,755 B2 | 6/2018 | Goetzen et al. | |
| 2009/0263723 A9 | 10/2009 | Zaghig et al. | |
| 2009/0280410 A1* | 11/2009 | Zaguib ................... | C23C 28/34 |
| | | | 429/220 |
| 2012/0021297 A1 | 1/2012 | Hauser et al. | |
| 2016/0236154 A1 | 8/2016 | Dubois et al. | |
| 2017/0279101 A1 | 9/2017 | Sago et al. | |

(Continued)

FOREIGN PATENT DOCUMENTS

JP        2001283813 A      10/2001

OTHER PUBLICATIONS

US 10,007,129 B2, 06/2018, Otts et al. (withdrawn)

(Continued)

*Primary Examiner* — Milton I Cano
*Assistant Examiner* — Mary G Henshaw
(74) *Attorney, Agent, or Firm* — Perkins Coie LLP

(57) ABSTRACT

An energy storage device includes an anode; a cathode; an electrolyte in contact with both the anode and the cathode; and an electrically non-conductive, porous separator between the anode and the cathode. At least one major surface of the porous separator includes a coating with a layer having a star polymer. The star polymer includes a hydrophobic core and at least three arms, wherein at least some of the arms includes ion-conductive polar functional groups.

16 Claims, 9 Drawing Sheets

(56) References Cited

U.S. PATENT DOCUMENTS

2020/0395586 A1* 12/2020 Kim .................... H01M 10/052
2021/0143511 A1*  5/2021 Zhang ................. H01M 4/382

OTHER PUBLICATIONS

Diep et al., Layer-by-layer assembled coreeshell star block copolymers for fouling resistant water purification membranes, Polymer 103:468-477 (2016).
Kang et al., Mussel- and Diatom-Inspired Silica Coating on Separators Yields Improved Power and Safety in Li-Ion Batteries, Chemistry of Materials 24:3481-3485 (2012).
Ryou et al., Excellent Cycle Life of Lithium-Metal Anodes in Lithium-Ion Batteries with Mussel-Inspired Polydopamine-Coated Separators, Advanced Energy Materials 2:645-650 (2012).
Deng et al., "Microporous polymer electrolytes based on PVDF/PEO start polymer blends for lithium ion batteries", Journal of Membrane Science 491 (2015) 82-89, May 2015, 8 pgs.
Wikipedia, Polymer Architecture, available at https://en.wikipedia.org/w/index.php?title=Polymer_architecture&oldid=1049182987 (downloaded on Oct. 25, 2021).
IBM Brochure, A Collection of Scientific Results for Impregum(tm) Polyether Impression Material, available at https://multimedia.3m.com/mws/media/387036O/3m-impregum-polyether-impression-material-collection-of-scientific-results.pdf&fn=imp_sci_facts.pdf (downloaded on Oct. 25, 2021).

* cited by examiner

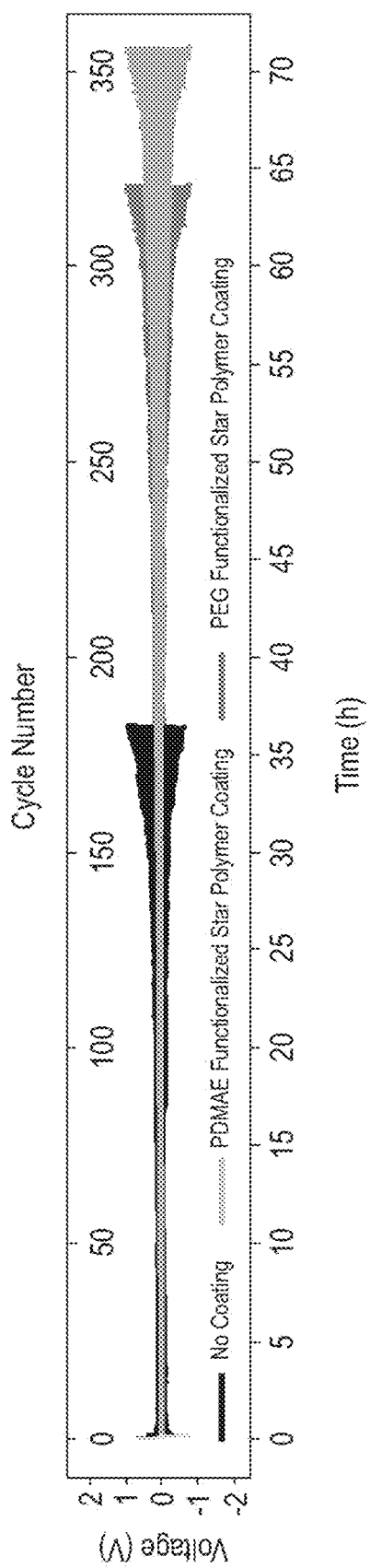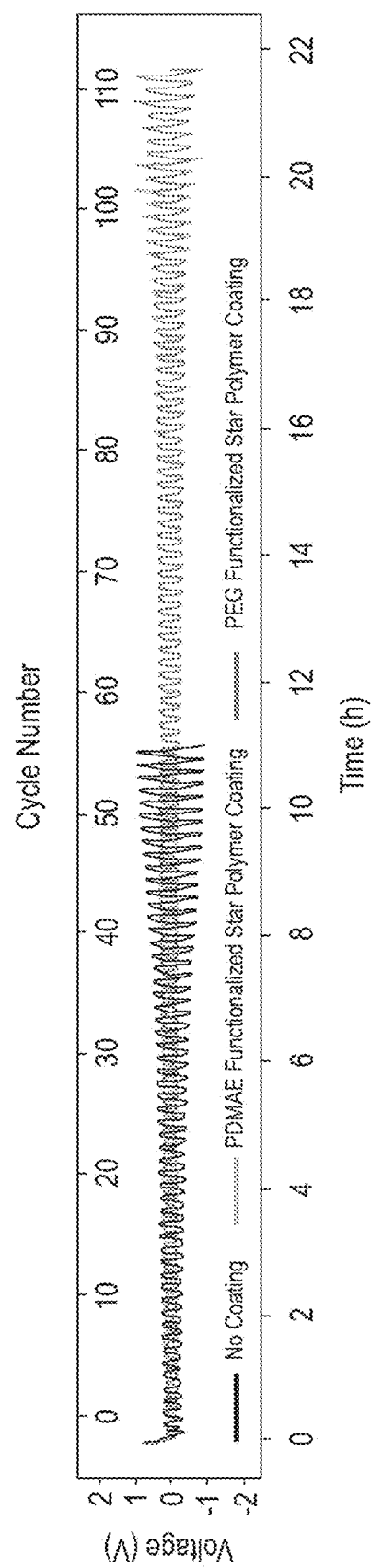
FIG. 4A
FIG. 4B

COATED SEPARATOR FOR ENERGY STORAGE DEVICE

BACKGROUND

Rechargeable batteries are used as a power source in a wide range of applications such as, for example, industrial devices, medical devices, electronic devices, electric vehicles, and grid energy storage systems. Battery technology is continually being developed to enable higher energy density and greater efficiency.

Metallic anodes, such as, for example, lithium, sodium, and/or magnesium may improve energy storage capability compared to conventional lithium-ion batteries that employ lithium intercalating graphitic anodes. The use of metallic anodes may also provide a relatively high specific energy in metal-sulfur batteries, metal-air batteries, metal-oxygen batteries, metal-carbon dioxide batteries, and batteries including metal with other gas mixtures including oxygen. For example, a lithium-oxygen battery could potentially have a theoretical specific energy three to five times greater than conventional lithium ion batteries. However, despite its superior energy density, lithium metal has been difficult to use as an anode in energy storage devices due at least in part to the growth of dendrites (needle-like metallic crystals) during operation of the device, which can cause electrochemical instability and electrical shorting in the device. Lithium metal is highly reactive to the ambient environment, and it has been difficult to find an efficient way to fully protect the surface of a lithium anode, while at the same time minimizing the thickness of the coating layer to retain overall cell-level energy density.

An energy storage device with a metallic anode such as Li, Na or Mg may also include an electrically non-conductive separator between the metallic anode and a cathode, which forces electrons through an external electrical circuit to which the battery is connected, such that the electrons do not travel through the energy storage device, while still enabling metal ions to flow through the energy storage device during charge and discharge.

SUMMARY

Some separators are made of hydrophobic polymeric materials, which have good chemical and electrochemical stability and mechanical properties. However, these hydrophobic polymers can have poor wettability with respect to the electrolyte solutions used in the energy storage device, which can cause irregular deposition of metal ions on the metallic anode and increase dendrite formation and growth.

To improve separator wettability, a polymer coating with polar functional groups has been applied on the surface of the separator. Although the polymeric surface modification increases the wettability of the polymeric separator, which can result in a good distribution of metal-ion flux and suppress dendrite growth, the polymeric surface coating can block micropores in the separator and retard metal ion-transfer through the separator.

In general, the present disclosure is directed to an ultra-thin coating material that can improve the wettability of the surfaces of a hydrophobic porous separator (including the surfaces of internal pores within the separator) with respect to the electrolytes used in an energy storage device such as, for example, a rechargeable metal battery, without substantially altering the original pore structure of the separator. Improved separator wettability can improve the electrochemical performance of the energy storage device by, for example, efficiently suppressing metal dendrite growth and enhancing cyclability.

Some metallic anode materials (for example, Li, Na, Mg) used in rechargeable metal batteries are very sensitive to air and/or moisture, which requires that protective coatings be applied on their surfaces in a highly controlled inert environment. The star polymer coatings described in the present disclosure can be applied to the separator under ambient conditions by exposing the separator to a solution including the star polymers, and this process is faster and easier than other surface modification methods such as chemical reaction and physical surface treatment. The amphiphilic conformal star polymers can, in some embodiments, self-assemble on the surfaces of the separator and form an ultrathin molecular layer thereon, which retains the original pore structure of the separator without causing unwanted pore blockages.

In one aspect, the present disclosure is directed to an energy storage device, including: an anode; a cathode; an electrolyte in contact with both the anode and the cathode; and an electrically non-conductive, porous separator between the anode and the cathode. At least one surface of the porous separator includes a coating having a layer that includes a star polymer with a hydrophobic core and at least three arms, wherein at least some of the arms include ion-conductive polar functional groups.

In another aspect, the present disclosure is directed to a method of making a porous separator for an energy storage device. The method includes applying, on a surface of the porous separator, an aqueous solution of star polymers, wherein the star polymers have a hydrophobic core and at least three arms having ion-conductive polar functional groups; and draining excess of the aqueous solution of the star polymers to form a coated porous separator.

In another aspect, the present disclosure is directed to an energy storage device, including: an anode including a metal selected from the group consisting of lithium, sodium, magnesium, and mixtures and combinations thereof; a cathode including a material selected from the group consisting of oxygen, sulfur, metal oxides capable of metal-ion intercalation, and mixtures and combinations thereof; an electrolyte in contact with both the anode and the cathode; and an electrically non-conductive, porous separator between the anode and the cathode. At least one surface of the porous separator includes a coating having a single layer of self-assembled star polymers, wherein the star polymers have a hydrophobic core and at least six arms, and wherein at least some of the arms include a backbone formed from a compound selected from the group consisting of polyethylene glycol methacrylate (PEGMA), dimethylaminoethyl methacrylate (DMAEMA), methacrylic acid (PMAA), precursors of the foregoing, and combinations thereof.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 4A is a plot of cycling behavior of Li|Li symmetric cells operated at a current density of 10.0 mA/cm$^2$ with 1 M LiTFSI-DME electrolyte, containing separators with and without star polymer coatings.

FIG. 4B is a plot of cycling behavior of Li|Li symmetric cells operated at a current density of 10.0 mA/cm$^2$ with 1 M LiPF6-EC-DMC electrolyte, containing separators with and without star polymer coatings.

Like symbols in the drawings indicate like elements.

DETAILED DESCRIPTION

Figure 1:
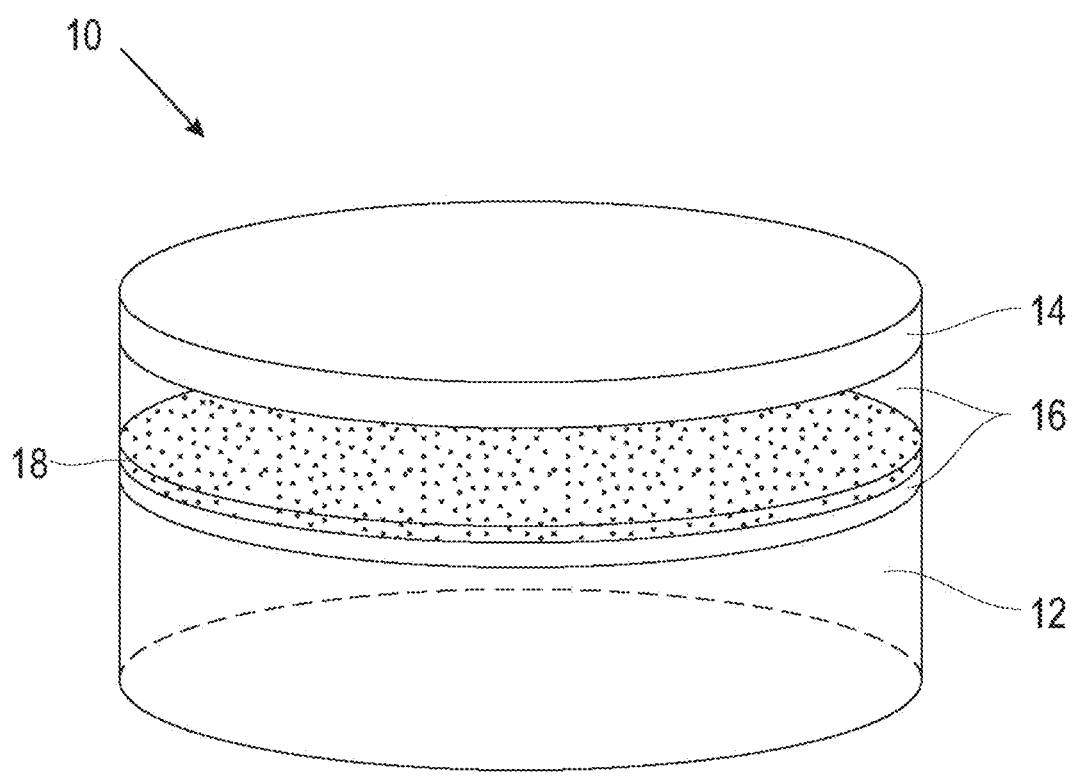
FIG. 1 is a conceptual diagram illustrating an example battery including an anode, an electrolyte, a cathode material, and a separator.

FIG. 1 is a conceptual diagram illustrating a battery 10 including an anode 12, an electrolyte 16, a cathode material 14, and a separator 18. In some embodiments, the battery 10 operates via reduction-oxidation (redox) reactions, and utilizes different oxidation states and redox reactions of one or more components or elements for charge and discharge cycles.

The anode 12 may be a metallic material including, but not limited to, lithium, sodium, or magnesium. In some embodiments, the anode 12 includes elemental lithium, sodium, or magnesium, or alternatively lithium, sodium, or magnesium alloyed with one or more additional elements. In some embodiments, the anode 12 consists essentially of elemental Li, Na, Mg, or alternatively any of Li, Na or Mg alloyed with one or more additional elements. In examples in which battery 10 operates via redox reactions, the metal of anode 12 (e.g., Li, Na, Mg) may be oxidized at anode 12 and reduced at cathode material 14 to induce the flow of electrons.

In some examples, the cathode 14 may include a material of suitable electrical conductivity that collects electrons generated by a redox reaction during discharge of battery 10 and provides a conductive path to an external electrical circuit to which battery 10 is connected. Similarly, during recharge of battery 10, the cathode 14 may provide an electrical pathway between an external voltage source and electrolyte 16 to supply voltage for another redox reaction to charge battery 10. In some cases, cathode 14 may include a current collector material such as an electrically conductive powder like a metal and/or carbon powder, woven or non-woven metal fibers, metal foam, woven or non-woven carbon fibers, or the like. In some embodiments, the cathode 14 may include stainless-steel mesh, aluminum (Al) mesh, nickel (Ni) foam, copper (Cu), and/or carbon paper. For example, the cathode 14 may include a stainless-steel mesh with carbon nanoparticles deposited thereon.

In some embodiments, the cathode 14 may include or be in contact with a source of oxygen or another gas mixture including oxygen. For example, the battery 10 may be a metal-oxygen battery, a metal-carbon dioxide battery, or a battery including metal with other gas mixtures including oxygen, in which the cathode 14 may include or be in contact with oxygen, air, carbon dioxide, or another gas mixture including oxygen. In some examples, the source of oxygen and/or cathode 14 may also include a catalyst. For example, the source of oxygen and/or cathode 14 may include a transition metal oxide, such as manganese oxide ($MnO_2$), chromium (III) oxide ($Cr_2O_3$), cobalt (II, III) oxide ($CO_3O_4$), and/or ruthenium (IV) oxide ($RuO_2$).

In some embodiments the cathode 14 may include sulfur. For example, cathode material 14 may include a current collector material with sulfur particles deposited thereon, or alternatively sulfur-coated carbon nanotubes. As another example, cathode material 14 may include a sulfur-containing cathode material including a redox-mediator. In some examples, the redox-mediator may include birnessite (δ-$MnO_2$), titanium dioxide ($TiO_2$), zirconium dioxide ($ZrO_2$), or combinations thereof.

In some embodiments, the cathode material 14 may be selected from materials suitable for use in a Li-ion battery such as, for example, lithium cobalt oxide (LCO, e.g., $LiCoO_2$), nickel cobalt aluminum (NCA, e.g., $LiNi_xCo_y$-$Al_zO_2$, $LiNi_{0.8}Co_{0.15}Al_{0.05}O_2$), lithium ion manganese oxide (LMO, e.g., $LiMn_2O_4$), lithium nickel manganese cobalt oxide (NMC, e.g., $LiNiMnCoO_2$), nickel cobalt manganese (NCM, e.g., $LiNi_xCo_yMn_zO_2$, $LiNi_{0.33}Co_{0.33}Mn_{0.33}O_2$), lithium iron phosphate (LFP, e.g., $LiFePO_4$), and mixtures and combinations thereof.

The battery 10 includes an electrolyte 16 between anode 12 and cathode material 14. Suitable electrolytes 16 may include a salt and a solvent and/or diluent. In some examples, the salt may include, but is not limited to, sodium trifluoromethanesulfonate (NaTf), lithium bis(trifluoromethylsulphonyl)imide (LiTFSI), lithium hexafluorophosphate ($LiPF_6$), lithium trifluoromethanesulfonate ($LiCF_3SO_3$), lithium bistrifluoromethylsulfonyl imide (Li($CF_3SO_2$)$_2$N), lithium nitrate ($LiNO_3$), lithium hydroxide (LiOH), lithium iodide, lithium chloride (LiCl), lithium bromide (LiBr), lithium fluoride (LiF), lithium perchloride ($LiClO_4$), lithium tetrafluoroborate ($LiBF_4$), lithium oxalyldifluoroborate (LiODFB), lithium bis(oxalato)borate (LiBOB), and mixtures and combinations thereof. Electrolyte 16 may additionally, or alternatively, include salts of sodium similar to those listed above for lithium.

In some examples, electrolyte 16 may also include one or more diluents. For example, electrolyte 16 may additionally include 1,2-dimethoxyethane (DME), diethyl sulfite, ethylene sulfites, ethyl methyl carbonate (EMC), fluorinated carbonates (e.g., fluoroethylene carbonate (FEC)), methyl acetate (MA), dimethyl sulfoxide (DMSO), ionic liquids (ILs), ethylene carbonate (EC), propylene carbonate (PC), dimethyl carbonate (DMC), diethyl carbonate (DEC), ethyl propyl ether (EPE), tetrahydrofuran (THF), 1,3-dioxolane (DOL), dimethyldiglycol (diglyme), triethylene glycol dimethyl ether (triglyme), tetra(ethylene glycol)dimethyl ether (TEGDME), adiponitrile, sulfones (e.g., allyl methyl sulfone), ethyl sulfite, phenylcyclohexane, vinylene carbonate, dimethylacetamide (DMA), n-methyl-2-pyrrolidone (NMP), diethyldiglycole (DEDG), acetonitrile (ACN), dimethyl formamide (DMF), ethylene glycol (EG), triethyl amine (TEA), ethyl acetate, and mixtures and combinations thereof.

The separator 18 is constructed of an electrically non-conductive material, resides between anode 12 and cathode material 14, and controls movement of electrons through battery 10 such that the electrons move through an external circuit to which battery 10 is connected. In various embodiments, the separator 18 is a material chosen from nonwoven fibers such as, for example, cotton, nylon, polyesters, and glass; organic polymers such as, for example, polyethylene, polypropylene, poly(tetrafluoroethylene), polyvinyl chloride, and polyimides; ceramics; and, natural non-conductive materials such as, for example, rubber, asbestos, and wood; and mixtures and combinations thereof. In some examples, which are not intended to be limiting, the separator 18 may include a glass microfiber or an epoxy-based polymeric compound.

Figure 2A:
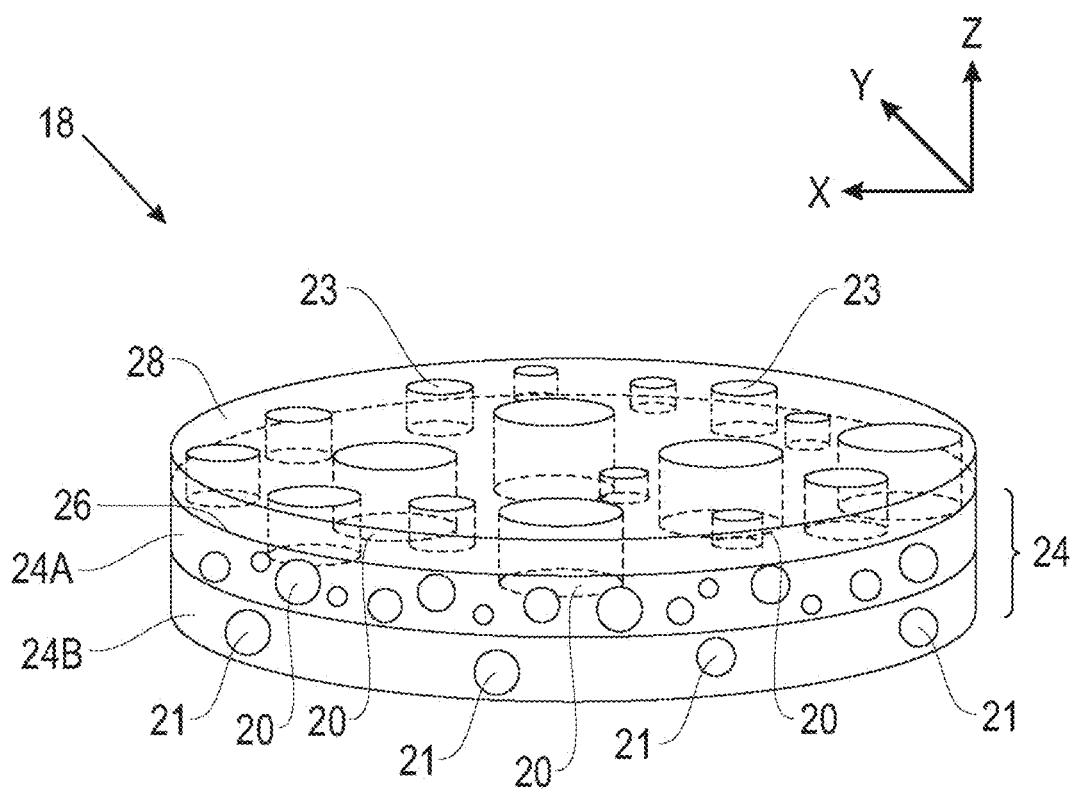
FIG. 2A is a cross-sectional view of an embodiment of a coated separator.

Referring to FIG. 2A, which is not drawn to scale, the separator 18 of the present disclosure includes a porous layer 24 having thereon a coating layer 28. The polymeric coating layer 28 includes at least one layer with functionalized star polymers, which increase the wettability of the separator with respect to the electrolyte. In the embodiment of FIG. 2A, the porous layer 24 includes a first porous layer 24A and an optional second porous layer 24B. The first porous layer 24A has a surface 26 on which the polymeric coating 28 is applied, but the polymeric coating 28 may be applied on either or both major surfaces of the first porous layer 24A, or on either or both major surfaces of the second porous layer 24B (if present).

Figure 2B:
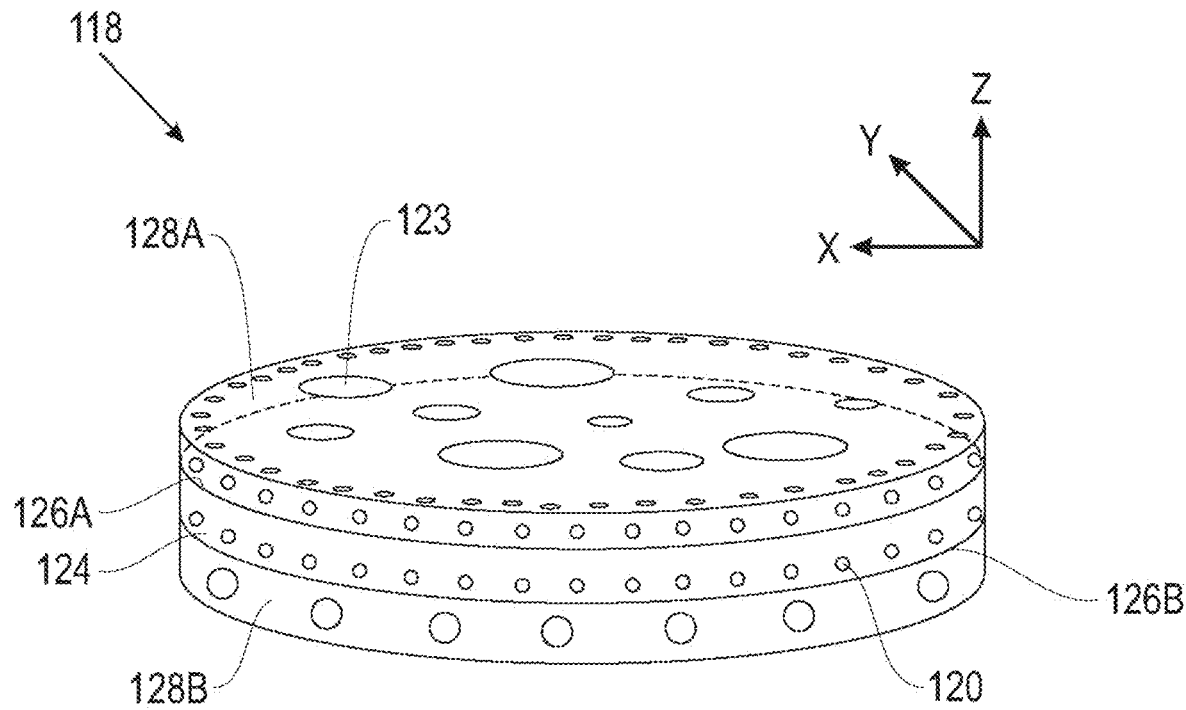
FIG. 2B is a cross-sectional view of an embodiment of a coated separator.

For example, in FIG. 2B, a separator 118 includes a porous layer 124 with a first major surface 126A and a second major surface 126B. A first polymeric coating layer 128A is on the first major surface 126A, and a second polymeric coating layer 128B is on the second major surface 126B, with at least one of the polymeric coating layers 128A, 128B including at least one layer with star polymers containing functionalized arms which are wettable toward an electrolyte solvent.

The porous layers 24 may be any suitable size and/or shape, and in some embodiments, which are not intended to be limiting, has a thickness of about 0.1 µm to about 500 µm, or about 0.1 µm to about 200 µm, or about 0.1 µm to about 100 µm, or about 0.1 µm to about 20 µm.

The porous layer 24A includes a plurality of voids 20 forming direct or tortuous passages through the thickness of the porous layer 24 along the z-direction in FIG. 2A. The optional porous layer 24B includes a plurality of voids 21 at least partially corresponding to the voids 20 in the porous layer 24A and forming substantially direct or tortuous passages along the z-direction through the thickness of the porous layer 24.

In various embodiments, the voids 20, 21 can have different sizes but substantially the same shape, may be substantially uniform in size and shape, or may have substantially the same size and different shape. The voids 20, 21 may be any suitable shape, and examples of cross-sectional shapes include regular or irregular circles, squares, hexagons, ellipses, and the like. In various embodiments, each void 20, 21 defines an average characteristic dimension such as, for example, a cross-section dimension, of about 1 nanometer and about 100 microns, about 1 nanometer and about 50 microns, or about 1 nanometer and about 20 microns. In some embodiments, the average characteristic dimension of the voids 20, 21 should be made larger and the passages through the separator 18 made less tortuous, which can make the separator 18 easier and/or less time consuming to manufacture.

In various embodiments, the first and second sub-layers 24A, 24B of the porous layer 24 can have any relative thickness, or may be substantially the same thickness.

In some examples, the first plurality of voids 20 of the first layer 24A may define a first pattern of voids and the second plurality of voids 21 of the second layer 24B may define a second pattern of voids. The first pattern of voids and the second pattern of voids may be the same or different, and the voids in the first plurality of voids 20 and the second plurality of voids 21 may have different sizes, shapes and patterns. In some examples, at least one of the first pattern of voids 20 and the second pattern of voids 21 include a regular pattern of voids. In some such examples, a separator 18 having a regular pattern of voids in at least one of first layer 24A and second layer 24B may be more homogeneous, which may improve the cyclic efficiency of the energy storage device 10.

Figure 3:
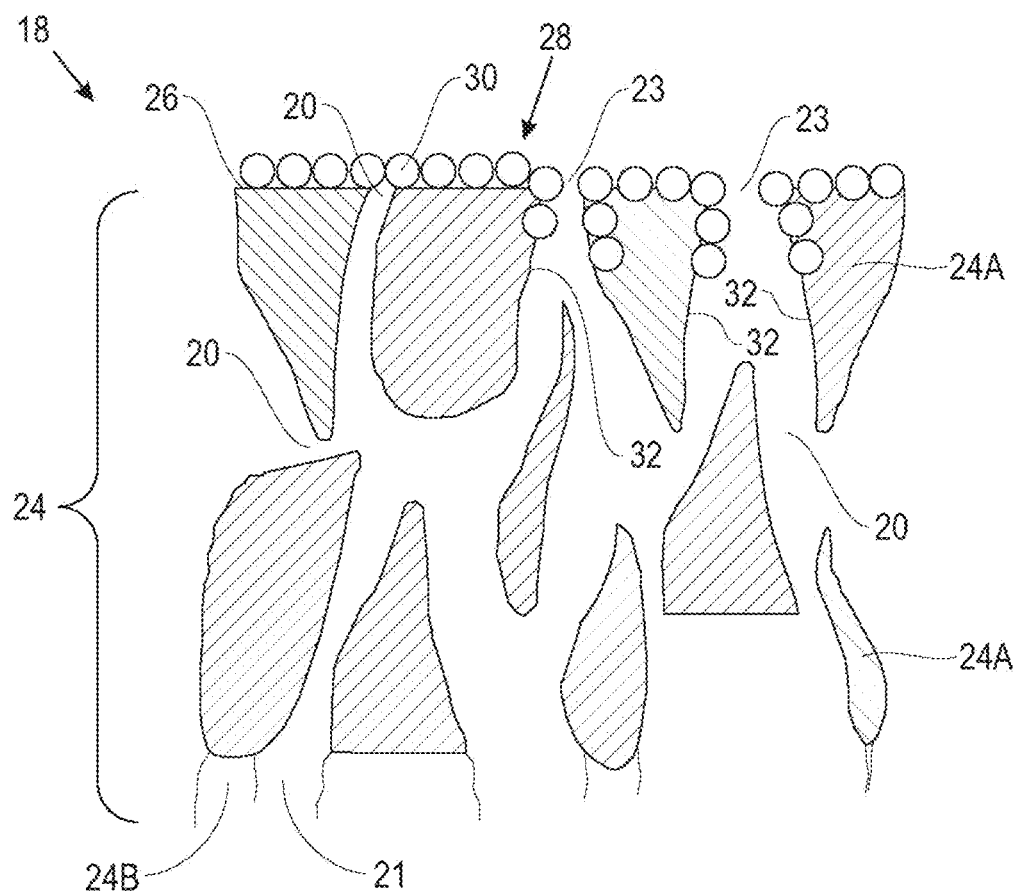
FIG. 3 is a cross-sectional view of a portion of a coated separator.

Referring to the schematic cross-sectional view of FIG. 3, the coating 28 may be continuous or discontinuous, and may overlie all or a portion of the surface 26 of the porous layer 24A. As shown in FIG. 1, in some embodiments the coating 28 includes some small gaps or pores 23 that overlie the pores 20 in the porous layer 24A and form relatively straight, as well as relatively tortuous, passageways through the porous layer 24A (as well as the optional porous layer 24B, if present). In some embodiments, the coating 28 can extend into the pores 20 of the porous layer 24A and coat at least a portion of the walls 32 of the pores 20 in the porous layer 24.

In the embodiment of FIG. 3, the coating 28 includes a single layer of functionalized star polymers 30. In various embodiments, the thickness of the coating 28 is about 1 nm to about 20 nm. In some embodiments, the coating 28 can include multiple layers of functionalized star polymers.

The coating 28 on the major surface 26 of the porous layer 24A of the separator 18 includes functionalized star polymers with a hydrophobic core and a plurality of polymer arms on the hydrophobic core, wherein the polymer arms include ion conducting polar functional groups.

In this disclosure the term "star polymer" refers to any branched polymer including a plurality of linear polymer arms (at least six) attached at a central core. The Matyjaszewski group at Carnegie Mellon University provides general information regarding the structure and synthesis of various star copolymers at the web site identifiable by the concatenation of "cmu.edu" and "maty/materials/Polymers with specific Architecture/star-copolymers.html."

The hydrophobic core, or the center, of the star polymers 30 making up the coating 28 can be an atom, molecule, or macromolecule, or a globular microgel (i.e., a cross-linked polymer gel of microscale proportions), and in some embodiments the core itself may be multifunctional. In various embodiments, the core contains aromatic, aliphatic, or mixed substituents with carbon only or mixtures containing heteroatoms. In some embodiments, the core is cross-linked and contains a plethora of surface functionality. In some embodiments, the core retains its shape by covalent crosslinking, although it could also be held together by electrostatic, hydrogen bonding, pi-stacking, or metal-ligand interactions.

In various embodiments, the core of the star polymers 30 making up the coating 28 includes a non-polar hydrophobic polymer, and suitable examples include, but are not limited to, hydrocarbon polymers such as polystyrene, polyethylene, polypropylene, poly(alkylmethacrylate), polyacrylamide, polycarbonate and polyester. The hydrocarbon polymer may optionally be crosslinked. In some embodiments, the hydrophobic core of the star polymer with non-polar moiety such as a hydrocarbon plays an important role in maintaining mechanical integrity of the coating 28 in the organic polar solvents that are typically used in the electrolyte 16 of the battery 10.

The chains, or "arms," of the star polymers 30 making up the coating 28 include variable-length organic chains, which can be made of similar or different monomeric units. At least some of the monomeric units making up the arms of the star polymers have ion conducting polar functional groups. The ion conducting polar groups are selected to promote metallic-ion transport (for example, Li-ion, Na-ion, K-ion, depending on the metal selected for the metallic anode). In one embodiment, polyethylene glycol (PEG), a Li-ion conductor, is included in the arms of the star polymers. In other embodiments, the ion conducting polar groups for the arms of the star polymers can include, but are not limited to, sulfonates, phosphonate, borate, and mixtures and combinations thereof.

In some embodiments, the polar functional groups on the arms of the star polymers are miscible with electrolyte and selected to promote wettability of the separator 18 toward the electrolyte solution 16 used in the battery 10. The improved wettability of the star polymer-coated separator 18 can provide more homogenous distribution of metallic ions (e.g., Li$^+$ for a lithium metal battery 10) within the electrolyte media 16 and near the surfaces of the electrodes 12, 14, which can minimize uneven dendrite growth on the metallic anode 12.

The arms on the star polymers in the coating layer 28 can be chemically identical (homostars) or different (heterostars or miktoarm stars). The arms may be composed of multiple monomers or polymers, resulting in star-block polymers or random star copolymers. In various embodiments, the star polymers include at least 3, or at least 6, or at least 10, or at least 20, or at least 30, or at least 60, arms covalently attached to the hydrophobic core.

In various embodiments, positively-charged moieties for the arms of star polymers include, but are not limited to, ammonium, phosphonium and sulfonium cations, as well as functional groups reasonably anticipated to become cationic in aqueous or acidic solution such as, for example, amines.

Non-limiting examples of useful negatively-charged moieties for the arms of star polymers include carboxylates, sulfonates, sulfinates, sulfonamides, phosphates, phosphinates, phosphonates, hydroxyamic acids, and imides.

In some embodiments, the polar arms may include zwitterionic moieties.

Non-limiting examples of other useful moieties for the arms of star polymers include, but are not limited to, hydrogen donors including alcohols or weak acids (COOH) with hydrogen acceptors containing ketones (for example, poly(N-vinylpyrrolidone)), amide (for example, poly(N-isopropylacrylamide) or hydroxyalkylamide), esters (for example, hydroxyalkylesters), ureas, thioureas, guanidines and alkylene oxide (for example, polyethylene oxide) moieties.

In various embodiments, the polar arms of the star polymers include a (meth)acryl backbone, wherein (meth)acryl includes acrylates and methacrylates. In some example embodiments, the (meth)acryl backbone is functionalized with ion conducting polar functional groups including, but not limited to, polyethylene glycol (PEG), and amines. Suitable (meth)acryl groups for the star polymer arms include, but are not limited to, polyethylene glycol (PEG) (meth)acrylates such as polyethylene glycol methacrylate (PEGMA), (meth)acrylamides, amino (meth)acrylates such as dimethylaminoethyl methacrylate (DMAEMA), (meth) acrylic acids such as polymethacrylic acid (PMAA), precursors of the foregoing compounds, and mixtures combinations thereof.

Star-shaped polymers can be synthesized through various approaches. The most common syntheses include an arm-first approach, in which the living chains are used as the initiators, and a core-first approach, in which the core is used as the initiator. Other synthetic routes include: controlled sol-gel processes, group transfer polymerization, transition metal catalysis, living anionic polymerization, living cationic polymerization, ring opening polymerization, ring-opening metathesis polymerization (ROMP), atom transfer radical polymerization (ATRP), reversible addition-fragmentation chain transfer polymerization (RAFT) and nitroxide mediated radical polymerization.

Referring again to FIGS. 1-3, in some embodiments the hydrophobic cores of the star polymers are selected so that the star polymers "self-assemble" on the hydrophobic major surface 26 of the porous layer 24 to form the star polymer coating 28. In various embodiments, the self-assembled coating 28 can be a single layer of star polymers, which is a monolayer of star polymers, or can include multiple layers of star polymers. In this application the term "self-assemble" means the star polymers align with one another in an organized structure or pattern of building blocks. The interactions between the hydrophobic cores of the star polymers, which can be, for example, the result of any of Van der Waals attraction, electrostatic charge interaction or electronic (e.g., charge transfer) interaction or hydrogen bonding or metal-ligand interaction, cause the star polymers to align with one another on the surface 26 to form the star polymer coating 28. In some embodiments, the star polymers lie down adjacent to one another without external direction to form the monolayer coating 28.

While not wishing to be bound by any theory, presently available evidence indicates that the hydrophobic interaction between the hydrophobic cores of the star polymers and the hydrophobic surface of the porous layer 24 drives the self-assembly behavior of the star polymers on the hydrophobic membrane surface 26, and the multiplicity of polar arms on the star polymers modify the surface wetting behavior of the surface 26 and make the surface 26 more miscible with an organic electrolyte solvent. The coating 28 effectively modifies the wettability of the surface 26 and the pores 32 of the porous layer 24 of the separator 18, and the high-density polar arms on the star polymers can enhance electrolyte-wettability of the separator improving ionic transport (diffusion) within the porous layer 24.

In another aspect, the present disclosure is directed to a process of modifying the wettability of a surface and/or pores of a separator for an energy storage device such as a battery. In this process the electrolyte-wettability of the surfaces of the pores of the separator is altered by applying, to the hydrophobic porous separator surface, a star polymer having a hydrophobic core and polar functional moieties on the exposed arms. The hydrophobic core of the star-polymer drives formation of a self-assembled monolayer of the star polymer through hydrophobic interaction with porous surface of the separator, which changes the wettability of the surface of the separator by exposing the polar functional moieties on the surface. In one embodiment, the process includes exposing a porous separator for a battery to a solution including a star polymer for a time sufficient to form a monolayer of star polymers on the surface of the separator and/or in the pores thereof.

In various embodiments, the star polymer solution can include any solvent that is compatible with other separator materials, and water and alcohols have been found to be suitable. In some embodiments, the solvent in the star polymer solution is aqueous, or may be water. In various embodiments, the star polymer is present in the star polymer solution at a concentration of about 0.01 wt % to about 10 wt %, about 0.1 wt % to about 5 wt %, about 0.1 wt % to about 1 wt %, or about 0.1 wt % to about 0.5 wt %.

In various embodiments, the separator is exposed to the aqueous solution of the star polymer for about 1 minute to about 5 hours. Following exposure to the aqueous star polymer solution, the treated separator may optionally be drained to remove excess star polymer solution.

In some embodiments, the treated porous layer on the separator may optionally be dried by heating in an oven or by exposure to ambient or heated air.

In various embodiments, the porous layer 24 may optionally be rinsed with a solvent prior to or after the draining step, and suitable solvents include water, particularly deionized water.

The resulting separator with the star polymer coating may then be incorporated into any suitable energy storage device such as a battery.

The present disclosure will now be described with respect to the following non-limiting examples.

EXAMPLES

Example 1

Preparation of Star Polymer Coated Separator and Cell Assembly

A solution of 1 wt. % amphiphilic star polymers functionalized with additional random block copolymers comprising four different compositions of poly(dimethylaminoethyl methacrylate) (PDMAE-MA) and poly(ethylene glycol) methacrylate (PEG-MA) (100 to 0, 50 to 50, 25 to 75, and 0 to 100) dissolved in deionized water was prepared in a 20-mL borosilicate glass scintillation vial. The amphiphilic star polymers included a non-polar, crosslinked polystyrene core and more than 35 arms of methacrylate polymers, each containing a plurality of polar functional groups.

A commercialized porous separator was immersed in the prepared solution for various time durations (1, 2, 5, 10, 20 mins), while lightly stirring the solution with a magnetic stir bar.

The separator membrane was then taken out from the solution and gently rinsed three times, 30 seconds each time, with fresh deionized water prepared in three different vials and dried at 70° C. under vacuum oven overnight.

The separator was coated with the self-assembled amphiphilic star polymer, wetted by a liquid electrolyte solution and placed in between metal electrodes. The cell assembly was performed in an argon filled glovebox with less than <0.1 ppm of water and oxygen.

Example 2

Functionalized Star Polymer Coated Separator with Ether Based Electrolyte

Figure 5:
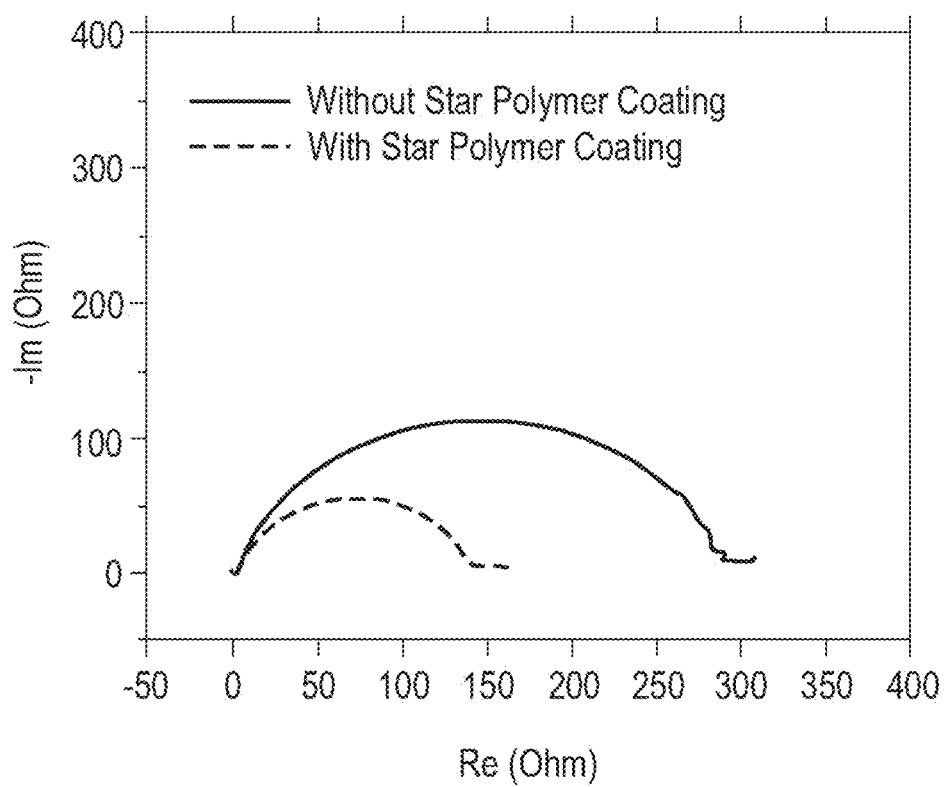
FIG. 5 is a plot of electrochemical impedance spectroscopy (EIS) spectra of the cells of Example 1 containing separators with and without the star polymer coating.

The cells equipped with the self-assembled amphiphilic star polymer coating on the separator functionalized with four different compositions of poly(dimethylaminoethyl methacrylate) (PDMAE-MA) and poly(ethylene glycol) methacrylate (PEG-MA) (100 to 0, 50 to 50, 25 to 75, and 0 to 100) from Example 1 displayed improved performance both in terms of charge transfer kinetics and rechargeability with a 1 M lithium bis(trifluoromethanesulfonyl)imide (LiTFSI) in 1,2-dimethoxyethane (DME) electrolyte solution selected as an example of the ether-based electrolyte (FIG. 4A). The cycling behavior of the Li|Li symmetric cells in FIG. 4A, using the self-assembled amphiphilic star polymer coated separator at a current density of 10.0 mA/cm$^2$, showed significant improvement in comparison with the cells using a pristine (uncoated) separator, doubling the cycle life without an exponential increase of the overpotential. The results align well with the Electrochemical Impedance Spectroscopy (EIS) spectra in FIG. 5, where the cell with the self-assembled amphiphilic star polymer coated separator showed lower charge transfer resistance than the cell with a pristine separator.

Figure 6:
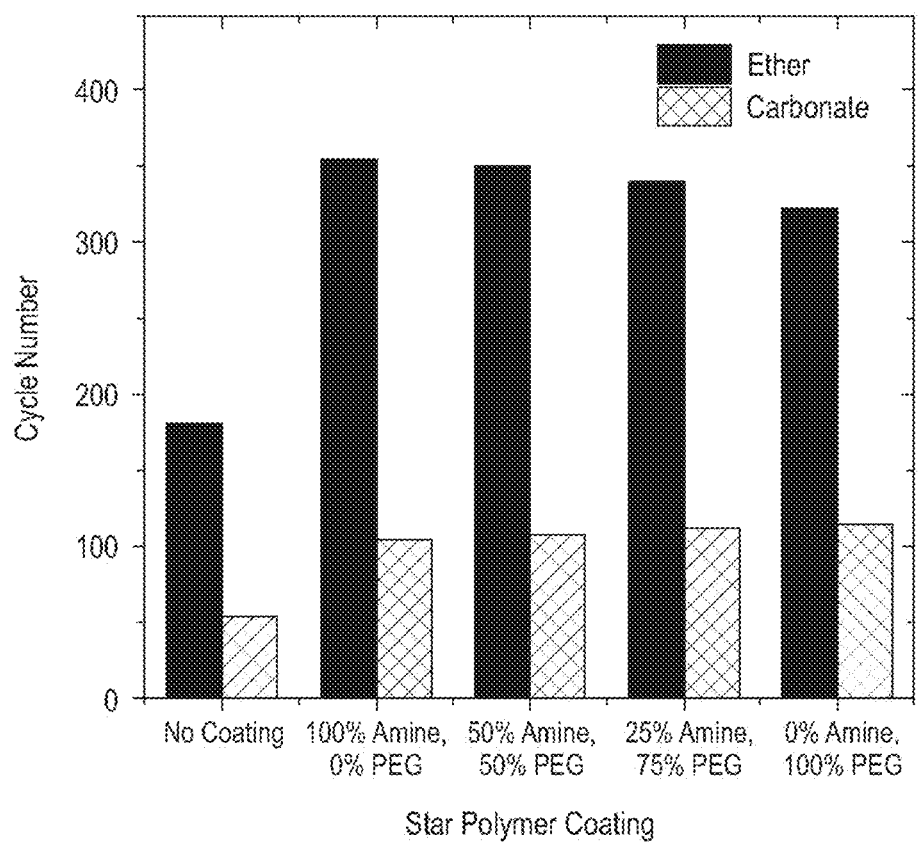
FIG. 6 is a plot of the cycle number of Li|Li symmetric cells at a current density of 10.0 mA/cm$^2$ with respect to the type of star polymer used to modify the separator membrane and the type of electrolyte used in the cell.

The cycle life of the cell using the separator coated with 100% PDMAE functionalized star polymer showed more improvement than the cell using 100% PEG functionalized star polymer when operated with the 1 M LiTFSI-DME electrolyte. While not wishing to be bound by any theory, the results of this example indicate that the ether-based electrolyte is more compatible with the amine functionalization of the star polymer coating. Regardless of which type of functionalized star polymer is used for the lithium metal protective coating, the improvement in cell rechargeability is shown in FIG. 6.

All cycling profiles were obtained while the cell was operated at a current density of 10.0 mA/cm$^2$. In at least one aspect, the results of this example show that selecting a functionalized group for the star polymer that is compatible with the electrolyte formulation used in a rechargeable battery can enhance the electrochemical performance of the battery.

Figure 7:
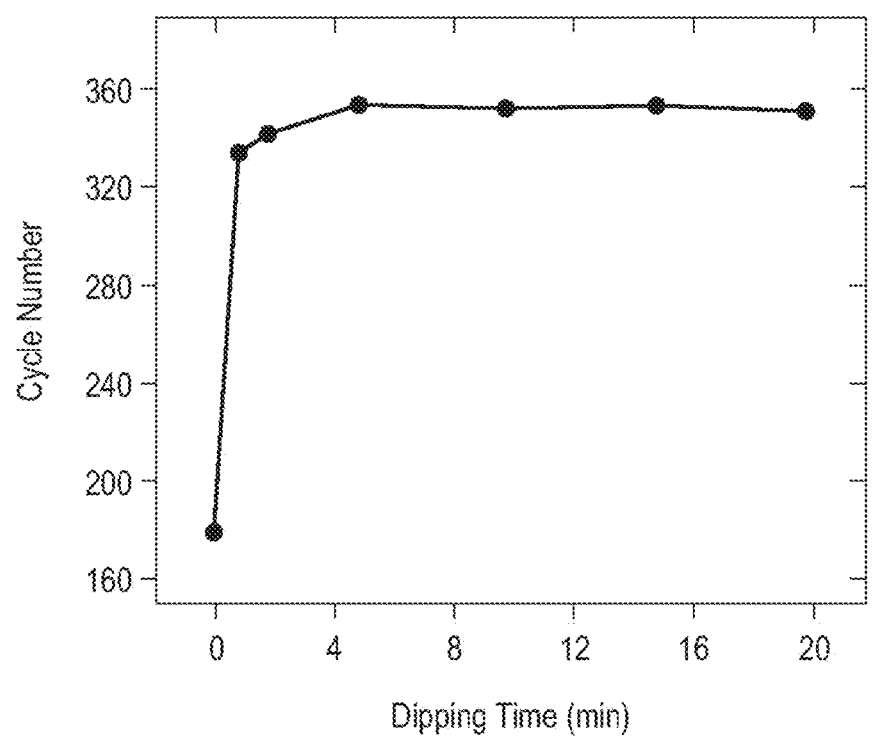
FIG. 7 is a plot showing the correlation between dipping time for a separator in a star polymer aqueous solution and the cycle number of the cells containing the star polymer modified separator at a current density of 10.0 mA/cm$^2$ with 1 M LiTFSI-DME electrolyte.

FIG. 7 shows that the cycle life of the cell incorporating the star polymer modified separator reaches over 320 when the dipping time of the separator into the star polymer solution is less than or equal to 1 minute.

Since the separators are not reactive with water, the dipping solution can be an aqueous solution using deionized water instead of an organic solvent. The aqueous dipping solution can make the process of making the coated separator more environmentally acceptable, enhance safety for the workers making the battery cells incorporating the coated separator, and lower overall manufacturing costs.

Figure 8A:
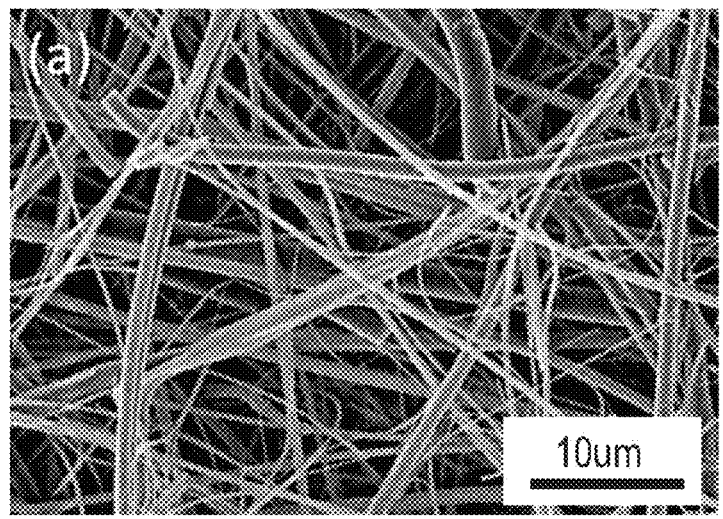
FIG. 8A is a Scanning Electron Microscope (SEM) image of a star polymer coated separator membrane with low resolution (scale bar=10 μm).
Figure 8B:
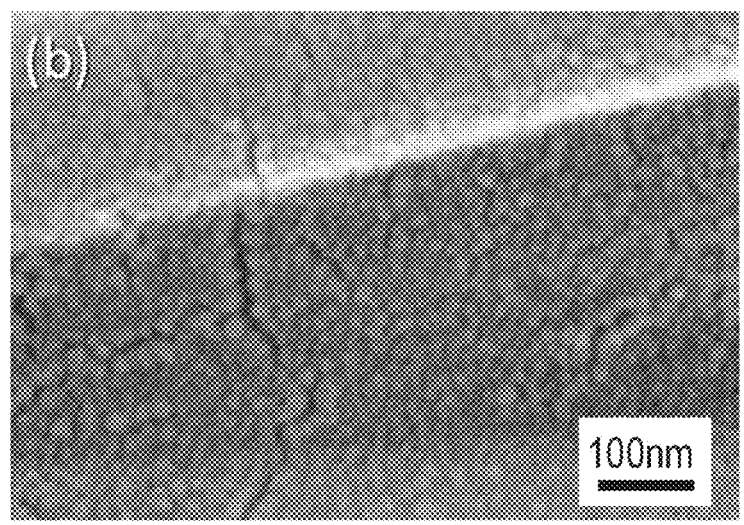
FIG. 8B is a Scanning Electron Microscope (SEM) image of a star polymer coated separator membrane with high resolution (scale bar=100 nm).

FIGS. 8A-8B show Scanning Electron Microscope (SEM) images of the star polymer coated separator membrane with low and high magnification, respectively. Star polymers, each with a size of approximately 20 nm in diameter, attracted one another and self-assembled on the surface of the separator to form an ultrathin monolayer.

Example 3

Functionalized Star Polymer Coated Separator with Carbonate Based Electrolyte

The battery cells equipped with the self-assembled amphiphilic star polymer coating on the separator functionalized with four different compositions of poly(dimethylaminoethyl methacrylate) (PDMAE-MA) and poly(ethylene glycol) methacrylate (PEG-MA) (100 to 0, 50 to 50, 25 to 75, and 0 to 100) of Example 1 displayed improved performance both in terms of charge transfer kinetics and rechargeability with a 1 M lithium hexafluorophosphate (LiPF$_6$) in a 1:1 (v/v) mixture of ethylene carbonate (EC) and dimethyl carbonate (DMC) electrolyte solution, which was selected as an example of a carbonate-based electrolyte (FIG. 4B). The cycling behavior of the Li|Li symmetric cells in FIG. 4B, using the self-assembled amphiphilic star polymer coated separator at a current density of 10.0 mA/cm², showed significant improvement compared to cells using an uncoated pristine separator, doubling the cycle life without an exponential increase of the overpotential.

The cycle life of the cell using the separator coated with the 100% PEG functionalized star polymer showed more improvement than the cell using 100% PDMAE functionalized star polymer when operated under the use of 1 M LiPF$_6$-EC-DMC electrolyte. While not wishing to be bound by any theory, the present results indicate that the carbonate-based electrolyte is more compatible with the PEG functionalization of the star polymer. Regardless of which type of functionalized star polymer is used for the lithium metal protective coating, cell rechargeability is improved, as shown in FIG. 6.

All cycling profiles were obtained while operating the cell at a current density of 10.0 mA/cm². As in Example 2 above, in at least one aspect the results of this example show that selecting a functionalized group for the star polymer that is compatible with the electrolyte formulation used in a rechargeable battery can enhance the electrochemical performance of the battery.

The coated separator of the present disclosure can improve the cycle life of the rechargeable lithium metal cell of which it is a part. The star polymer coating enhances the wettability of the separator toward a number of electrolytes, which can promote more even distribution of lithium dendrite growth during the charging of the cell. The process described herein for forming a coating that includes star polymers on a porous separator is simple, rapid and safe, and can easily be incorporated into a manufacturing process for making a separator or an energy storage device.

Various examples have been described. These and other examples are within the scope of the following claims.

What is claimed is:

1. An energy storage device, comprising:
   an anode;
   a cathode;
   an electrolyte in contact with both the anode and the cathode;
   an electrically non-conductive, porous separator between the anode and the cathode; and
   at least one coating layer disposed on at least one surface of the porous separator, wherein the at least one coating layer comprises star polymers and coats at least a portion of walls of pores in the porous separator, wherein each of the star polymers comprises a hydrophobic core and at least three arms, wherein the at least one surface of the porous separator includes a hydrophobic surface such that the star polymers form a single layer of the star polymers that coats the at least a portion of walls of pores without blocking the pores by allowing hydrophobic cores of star polymers to form a molecular layer on the hydrophobic surface, wherein at least some of the arms comprise ion-conductive polar functional groups, wherein the coating has a thickness between about 1 nm and about 20 nm.

2. The energy storage device of claim 1, wherein a wettability of the surface of the porous separator that includes the ion-conductive polar functional groups on the arms of the star polymer, with respect to the electrolyte, is higher than a wettability of a surface of a separator that does not include the ion-conductive polar functional groups on the arms of the star polymer.

3. The energy storage device of claim 1, wherein the hydrophobic core of the star polymers comprises a hydrocarbon polymer.

4. The energy storage device of claim 3, wherein the hydrocarbon polymer is selected from the group consisting of polystyrene, polyethylene, polypropylene, and mixtures and combinations thereof.

5. The energy storage device of claim 3, wherein the hydrocarbon polymer is crosslinked.

6. The energy storage device of claim 1, wherein the arms of the star polymer comprise a (meth)acryl backbone.

7. The energy storage device of claim 6, wherein the backbone is formed from a compound selected from the group consisting of polyethylene glycol methacrylate (PEGMA), dimethylaminoethyl methacrylate (DMAEMA), polymethacrylic acid (PMAA), precursors of the foregoing, and combinations thereof.

8. The energy storage device of claim 1, wherein the anode comprises a metal selected from the group consisting of lithium, sodium, magnesium, and mixtures and combinations thereof.

9. The energy storage device of claim 1, wherein the cathode comprises a material selected from the group consisting of oxygen, sulfur, metal oxides capable of metal-ion intercalation, and mixtures and combinations thereof.

10. The energy storage device of claim 1, wherein the porous separator comprises a material selected from the group consisting of nonwoven fibers and nonwoven polymers.

11. The energy storage device of claim 10, wherein the porous separator is a material selected from the group consisting of glass fibers, epoxy compounds, and mixtures and combinations thereof.

12. The energy storage device of claim 1, wherein the porous separator comprises voids having an average characteristic dimension of between about 1 nanometer and about 100 microns.

13. The energy storage device of claim 1, wherein:
   the porous separator comprises a first layer and a second layer, the first layer comprising a first plurality of voids having a first average characteristic dimension, and the second layer comprising a second plurality of voids having a second average characteristic dimension different than the first average characteristic dimension; and
   the first plurality of voids defines a first pattern of voids in the first layer, and the second plurality of voids defines a second pattern of voids in the second layer.

14. An energy storage device, comprising:
   an anode comprising a metal selected from the group consisting of lithium, sodium, magnesium, and mixtures and combinations thereof,
   a cathode comprising a material selected from the group consisting of oxygen, sulfur, metal oxides capable of metal-ion intercalation, and mixtures and combinations thereof;
   an electrolyte in contact with both the anode and the cathode;
   an electrically non-conductive, porous separator between the anode and the cathode; and
   at least one coating layer disposed on at least one surface of the porous separator, wherein the at least one coating layer comprises star polymers and coats at least a portion of walls of pores in the porous separator, wherein each of the star polymers comprise a hydrophobic core and at least six arms, and wherein at least some of the arms comprise a backbone formed from a compound selected from the group consisting of polyethylene glycol methacrylate (PEGMA), dimethylaminoethyl methacrylate (DMAEMA), polymethacrylic acid (PMAA), precursors of the foregoing, and combinations thereof, wherein the at least one surface of the porous separator includes a hydrophobic surface such that the star polymers form a single layer of the star polymers that coats the at least a portion of walls of pores without blocking the pores by allowing hydrophobic cores of star polymers to form a molecular layer on the hydrophobic surface, wherein the coating layer has a thickness between about 1 nm and about 20 nm.

15. The energy storage device of claim 14, wherein the hydrophobic core of the star polymers comprises a hydrocarbon polymer selected from the group consisting of polystyrene, polyethylene, polypropylene, and mixtures and combinations thereof.

16. The energy storage device of claim 15, wherein the hydrocarbon polymer is crosslinked.

* * * * *